June 20, 1944.  J. F. O'BRIEN  2,351,631
ELECTRICITY CONDUCTOR UNIT
Filed June 14, 1941
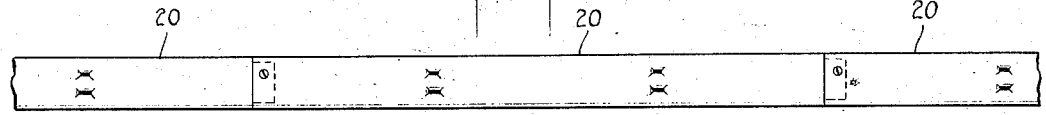
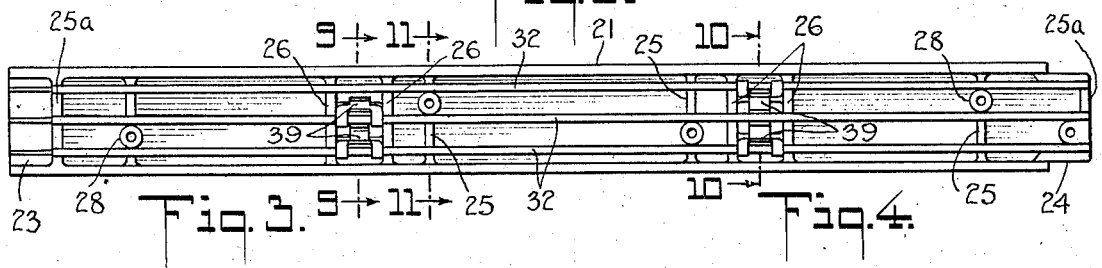
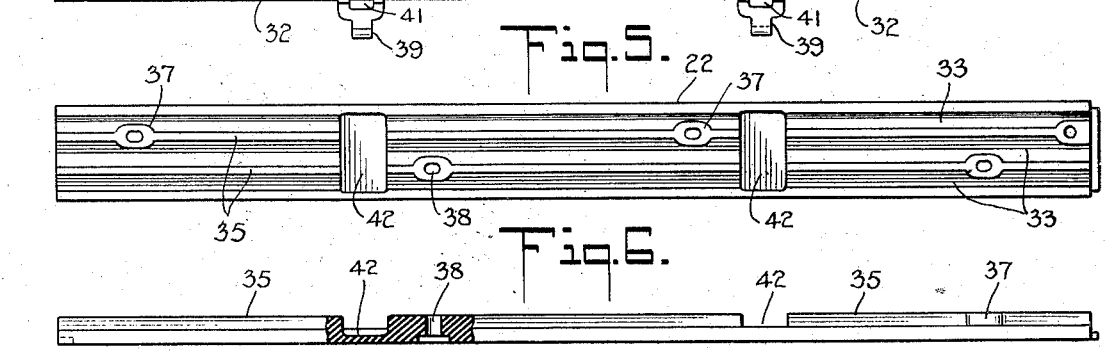
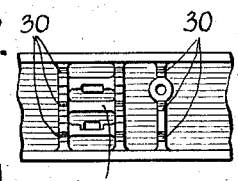
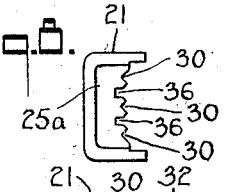
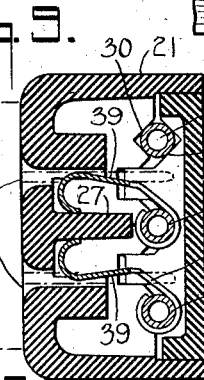
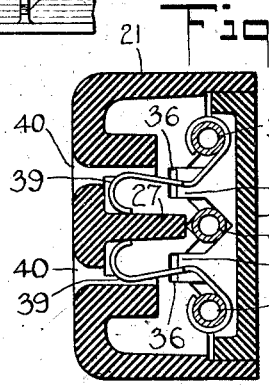
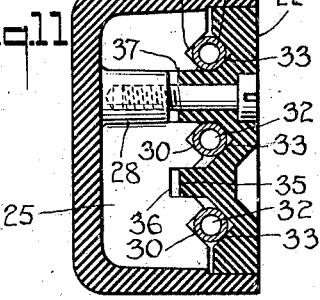
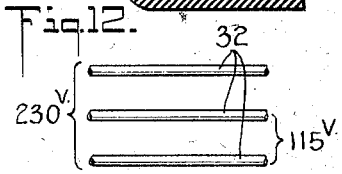
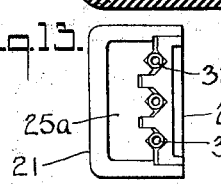
INVENTOR
Joseph F. O'Brien
HIS ATTORNEY Patented June 20, 1944

2,351,631

UNITED STATES PATENT OFFICE 2,351,631

ELECTRICITY CONDUCTOR UNIT

Joseph F. O'Brien, Jersey City, N. J., assignor to John B. Pierce Foundation, New York, N. Y., a corporation of New York Application June 14, 1941, Serial No. 398,030

11 Claims. (Cl. 173—334.1)

The present invention relates to improved electricity conductor units, and particularly to conductor units arranged for seriatim mechanical and electrical interconnection with other units to form an electric wiring system.

It is an object of the invention to provide an electricity conductor unit having a plurality, preferably three, of electricity conductors disposed therein in mutually insulated spaced relationship and having end terminals positioned according to a pre-established standard.

It is an object of the invention to provide an electricity conductor unit, aforesaid, adaptable for high and/or low voltage service, such for example, as 115 and 230 volts.

It is an object of the invention to provide an electricity conductor unit wherein one of the electricity conductors may be removed, if desired, to render the unit adaptable for either high voltage or low voltage service, but not for both services.

It is an object of the invention to provide an electricity conductor unit having a plurality of electricity conductors removably contained therein, and adaptable for the reception and positioning, according to the pre-established standard, of electricity conductors of greater diameter or greater transverse area, whereby an increased electrical load may be carried by the units.

In a preferred form, the electricity conductor unit includes a two-part body, desirably molded from plastic materials of suitable dielectric qualities, said body including a three-sided cap member having top and side walls of suitable configuration, and a base member for cooperation therewith to form the fourth, or closing side, of the unit.

Within said cap member may be disposed any suitable plurality of transverse walls having grooves arranged in longitudinal alignment, it being understood that there is a series of such aligned grooves for each of the electricity conductors to be contained within the unit. The base member is formed with other conductor-receiving grooves, each base member groove being in opposition to the corresponding groove in the cap member.

The grooves have sloping surfaces; the grooves in the cap member diverge from apices which are in longitudinal alignment, and the surfaces of the base member grooves converge toward apices which are in longitudinal alignment. Most preferably, the apices of the cap and base member grooves are in a common plane.

In a preferred form of the invention, the sloping surfaces of the grooves are planar, but the apices of the grooves need not necessarily be angular.

When the base and cap members are in their ultimate operative association, it is apparent that the opposed grooves thereof define substantially quadrilateral, diamond-shaped passages. An electricity conductor of suitable diameter, if round, or of suitable vertical and horizontal dimension, if rectangular, is positioned within said quadrilateral passages, and the sides of the passages will be tangential to such conductor.

The cap and base members of the unit are adjustable relative to each other in a manner which permits the apices of the therein opposed grooves to be moved closer or further apart, to accommodate conductors of any desired size within the limits of adjustability of the cap and base members. Because of the sloping surfaces of the respective grooves and the alignment of the apices of the upper and lower grooves, it is apparent that the center line of a large conductor will be positioned in precisely the same location as the center line of the smallest conductor suitable for use with the unit.

The accuracy and uniformity of positioning of the conductors regardless of the sizes thereof is important in maintaining the uniformity of positioning of conductors at the ends of the unit to expedite the mechanical and electrical interconnection of a series of units, and also for uniformity of positioning with respect to attachment plug-receiving apertures provided in the outer wall of a unit in the circumstance that the unit is to be of an outlet provided type.

By forming the body of the unit adaptable for the reception of three conductors, the unit may be used for three-wire service wherein the two outer conductors may carry 230 volts and an outer and an inner conductor employed for 115 volt service. In industrial installations, it may be necessary to provide only 230 volts, whereupon the center of the three conductors may be completely removed from the unit without disarrangement of the remaining conductors. In domestic service, it may be necessary to use only 115 volts, and two suitable conductors may be employed and the third removed from the unit. Pursuant to the construction of the unit and the attendant facility of arrangement of the conductors therein, the cap and base members may be standardized regardless of the ultimate service of the unit.

Other objectives and advantages will hereinafter appear.

In the accompanying drawing:

Fig. 1 is an elevation of a series of units embodying the present invention;

Fig. 2 is a rear elevation of the cap member of a unit of Fig. 1, with the conductors in position;

Figs. 3 and 4 are respectively elevations of portions of the electricity conductors employed with the unit, Fig. 3 showing the swaged terminal end of a tubular conductor and Fig. 4 showing the plain or socket end of such tubular conductor;

Fig. 5 is a plan view of the base member of a unit;

Fig. 6 is a side elevation of the base member, with a portion broken away for purpose of illustration;

Fig. 7 is a fragmentary elevation of the cap member of Fig. 2, with the conductors removed to illustrate the apertures in the front wall of an outlet-provided cap member and the transverse walls within the grooves of which the electricity conductors are positioned;

Fig. 8 is an end elevation of the cap member;

Fig. 9 is an enlarged section taken on the station 9—9 of Fig. 2;

Fig. 10 is an enlarged section taken on the station 10—10 of Fig. 2;

Fig. 11 is an enlarged section taken on the station 11—11 of Fig. 2;

Fig. 12 is a schematic wiring representation showing the manner in which either 230 volts or 115 volts may be taken from the unit; and Fig. 13 is an end elevation of an assembled unit.

Referring to the drawing, Figure 1 illustrates a series of electricity conductor units according to the present invention. Each unit illustrated is of an outlet-provided type, but the invention is not restricted to units of such type.

A unit 20, in its preferred form, consists of a cap member 21 having a suitable configuration of front and side surfaces, and a base member 22 for cooperation therewith. The cap 21 is advantageously formed by molding suitable plastic materials of requisite dielectric property into a rigid structure; base member 22 may also be of such material, although relatively resilient rubber compounds may give to such base member attributes of flexibility and yieldability.

Illustratively, the cap member is three-sided and substantially hollow, and the base member forms the fourth, or closing side; desirably, base member 22 fits between the side walls of the cap, and is adjustable with respect to the front wall of such cap. Although the electricity conductor unit is adapted for use as a molding strip, and, if desired, as part of the baseboard of a room, it is apparent that the units may be run along a wall or other part of a building in much the same manner as conventional metal molding is presently run.

The cap member 21 has a socket end 23 and a projecting end 24 to provide a male and female connection of adjacent units as indicated in dotted line in Figure 1.

At suitable intervals along the length of the cap member, there are provided any suitable plurality of transversely extending walls 25, end walls 25a, and in the circumstance of an outlet-provided unit, paired transverse walls 26 for each of the outlets. With such paired walls 26, it is desirable to have a central longitudinally extending wall 27 against which the contact clips may press, as shown in Figs. 9 and 10. Any or all of the transverse walls 25 may have bosses 28, adapted to receive a machine screw or like device for securing the cap and base members together as shown in Figure 11.

Each of the transverse walls 25, including the walls 25a, 25a which define the effective ends of a unit, and preferably each of the transverse walls 26, is provided with grooves 30, see Figures 7 and 11, said grooves being in longitudinal alignment, and there being one set of longitudinally aligned grooves for each of the conductors 32 of the unit. In the unit illustrated, there are three conductors, and hence there are three sets of longitudinally arranged grooves.

Illustratively, the grooves 30 are substantially V-shaped, thereby having straight sides, uniformly sloping toward their respective apices. The expression "uniformly sloping" does not necessarily mean that each surface of each groove makes the same angle with respect to a median plane, but rather that each corresponding surface of each of the grooves of a longitudinal run of grooves within the body of the unit has the same angle of slope.

Obviously, it is not necessary for the grooves to come to an angular apex, nor is it necessary for the wall surfaces of the grooves to be planes; for example, a groove may be an arc of a suitable ellipse or other curved surface and function properly in positioning the electricity conductors within the unit.

The base member 22 is formed with a matching group of longitudinally extending substantially V-shaped grooves or series of grooves 33 arranged in opposition to the grooves 30 of the cap member. The apex of each groove is in the same plane as the apices of the corresponding opposed groove of the cap member 21. Similarly to the grooves 30, the grooves 33 may have straight or suitably curved sides. It clearly appears from Figure 11 that when the cap and base members of a unit are in proper position, the straight sided grooves thereof define diamond-shaped, quadrilateral, passages in which the apices of the grooves are in the plane of the center of the conductor. It also appears that the surfaces of the grooves are tangential to a conductor having a circular cross section; the word "tangential" is deemed to be sufficiently accurate to describe the point of contact of the groove surfaces with a rectangular or oval conductor because it will be apparent that such contact of groove surfaces with conductor surfaces is substantially only at a point on the surface of the conductor.

For stability of securement of the conductors, it is preferable that the surfaces of the grooves extend beyond the point of tangency with the conductor for the largest size which the unit is capable of accommodating, but do not extend beyond the center plane of the conductors. It is also preferable, see Figures 9 and 11, that for the smallest size of conductor the opposing surfaces of the base 22 and the respective transverse walls 25 and 26 of the cap member 21 do not come into contact, thereby assuring that when the cap and base elements are assembled, the illustrated machine screws will be thoroughly effective to clamp the conductors 30 firmly in position.

As appears in Figures 5, 10, and 11, the base 22 is characterized by longitudinally extending walls 35, 35 extending above the uppermost surface of a conductor 32 and interfitting with suitable recesses 36, 36 provided in the various transverse walls of the cap member. The longitudinally extending walls 35 are effective to isolate the conductors and prevent electric leakage therebetween by deterring accumulations of dirt which, through dampness, may become electrically conductive. An additional attribute of walls 35, 35 is to strengthen the sloping shoulders of the grooves 30 in the transverse walls of the cap member 21, by providing abutments which resist the spreading action which the conductors 32 exert upon such sloping shoulders.

Bosses 37 are provided in walls 35, and match in number and relative position, the bosses 28 of the cap 21. Preferably, the passages 38 through such bosses 37 are countersunk, see Fig. 6, to accommodate the head of a machine screw or equivalent. By staggering the bosses 37, the strain of the securement of cap 21 and base 22 is distributed.

The apices of the respective opposed grooves being in a common plane and the walls of each groove sloping uniformly, as aforesaid, it is obvious that conductors of any diameter or size within the range of accommodation of the unit will be precisely aligned, as to spacing and position with respect to the upper and lower walls of a unit. In fact, the tighter the machine screws are made up, the more accurate will be the alignment.

The units which have been chosen for illustration herein are outlet-provided, and necessarily include spring metal electric contact devices, or equivalent, 39, the precise configuration of which depends upon the position of the conductors to which the contact devices 39 are attached. It has been stated that in the three-conductor unit illustrated, the two outside conductors 32 may be interconnected with the principal power source to provide 230 volt service, whereas the use of a central and an outside conductor provides 115 volt service. For purpose of illustration, a unit has been shown as embodying both voltage service, pursuant to which, in Figure 9, the electric contact devices 39 are electrically connected to a central and an outer conductor, whereas the unit of Figure 10 illustrates such devices 39 connected to the two outer conductors. As is apparent from Figures 9 and 10, the apertures 40, 40 in the face of the cap member 21 are centrally located with respect to the trio of conductors, and, therefore, no conductor 32 is immediately beneath an aperture 40, rendering accidental access to any conductor improbable, if not impossible. Suitably offset contacts 39 bring the contacting surfaces thereof into proper position.

As is shown from Figure 9, the overall depth of the unit is compacted to a degree wherein the blades of the contact plug P may pass adjacent the sides of a conductor. Accordingly, the contacts 39 are preferably bifurcated, to provide openings 41 between the legs of the contacts. The length of an opening 41 is desirably slightly greater than the width of an attachment plug blade standard for the service required, and the plug blades may thereby pass through said openings 41 without conflict. Additionally to accommodate such plug blades, and particularly to accommodate blades which may be longer than standard length, the base 22 is provided with pockets 42 beneath the contacts 39.

Whereas I have described my invention by reference to specific forms thereof, it will be understood that many changes and modifications may be made without departing from the spirit of the invention.

I claim:

1. An electricity conductor unit comprising a substantially hollow body composed of interfitting cap and base members, said cap and base members being mutually adjustable in a vertical plane while maintaining engagement of their respective wall portions to prevent ingress into said hollow body from the sides thereof; said cap member having a plurality of transverse walls interiorly thereof, said transverse walls having grooves arranged in longitudinal alignment, said grooves having uniformly sloping surfaces diverging from longitudinally aligned apices; said base member having a similar number of grooves arranged in opposition to the grooves in said cap member and having uniformly sloping surfaces converging toward an apex which is in the vertical plane of the apex of the corresponding groove in the cap member, whereby an electricity conductor of circular cross section may be confined within the unit by tangential engagement with the surfaces of said opposed grooves for variant diameters of said electricity conductors within the range of adjustibility of said cap and base members.

2. An electricity conductor unit comprising a substantially hollow cap member having a plurality of relatively thin transverse walls arranged therein, said walls having grooves disposed in longitudinal alignment and formed with uniformly sloping surfaces diverging from longitudinally aligned apices; a base member for said cap adapted to operate as a closure therefor, and provided with longitudinally extending grooves arranged in opposition to the grooves in said cap, said grooves having uniformly sloping surfaces converging toward an apex which is in a common vertical plane with the apices of the grooves in the cap member, said base member having means for reinforcing the transverse walls of the cap member between adjacent grooves thereof; electricity conductor means removably confined within said unit in tangential engagement with said cap and base grooves and extending longitudinally of the unit, the sloping surfaces of the grooves extending beyond their point of tangency with said conductor means but not beyond the center plane of the conductor; and means for securing said base member to said cap member.

3. An electricity conductor unit comprising a substantially hollow cap member having relatively thin transverse walls defining the effective ends thereof, said walls having a plurality of substantially V-shaped grooves therein, the apex of the corresponding groove in each of said transverse walls being in longitudinal alignment, and said grooves having uniformly sloping surfaces; a base member for said cap adapted to operate as a closure therefor, said base member having longitudinally extending substantially V-shaped grooves arranged in opposition to the grooves in said cap member, said base member grooves having uniformly sloping surfaces converging toward an apex which is in a common vertical plane with the apices of the grooves in the cap member; said base member having vertically extending walls adjacent its said grooves adapted to interfit within, and engage with the side walls of, channels in said cap member transverse walls disposed between the grooves therein; an electricity conductor removably confined within said unit between and in engagement with opposing cap and base grooves and extending longitudinally of the unit, the sloping surfaces of the grooves being tangential to said electricity conductor; the facing surfaces of the transverse walls of the cap member and the surface of the base member being in spaced relationship when the conductor means are in position; and means for securing said base member to said cap member.

4. An electricity conductor unit comprising a substantially hollow cap member having three principal sides and transverse walls defining the effective ends of the member and of less height than the side walls of the member to present end surfaces in spaced relationship with the lower edges of said side walls, said transverse walls having a plurality of substantially V-shaped grooves therein, the apex of the corresponding groove in each of said transverse walls being in longitudinal alignment, and said grooves having uniformly sloping surfaces; a base member for said cap adapted to fit internally of said cap and having smooth side walls in engagement with correspondingly smooth side walls of said cap and freely adjustable with respect to the front wall of the unit to permit the internal depth of the unit to be increased or decreased while maintaining the engagement of side walls of said cap and base members; said base member having a like plurality of V-shaped grooves extending longitudinally thereof, the apices of said grooves facing the apices of the grooves in the transverse walls of the cap member and being in the same plane; an electricity conductor removably positioned within the space defined by a groove in said cap and base member in engagement with wall surfaces of said grooves; and means for securing said cap and base members.

5. An electricity conductor unit comprising a substantially hollow cap member having three principal sides and transverse walls defining the effective ends of the member and of less height than the side walls of the member to present end surfaces in spaced relationship with the lower edges of said side walls, said transverse walls having a plurality of substantially V-shaped grooves therein, the apex of the corresponding groove in each of said transverse walls being in longitudinal alignment, and said grooves having sloping surfaces; a base member for said cap adapted to fit internally of said cap intermediate and in engagement with the side walls thereof and adjustable with respect to the front wall of the unit to permit the internal depth of the unit to be increased or decreased; said base member having a like plurality of V-shaped grooves extending longitudinally thereof, the apices of said base member grooves facing the apices of the grooves in the transverse walls of the cap member and being in the same plane; an electricity conductor positioned within the space defined by each of said opposed cap and base member grooves; the front wall of said cap member having paired apertures, each of which is positioned intermediate a pair of said grooves and thereby intermediate the conductors therein, and said electricity conductors having electric contact means offset to present contacting surfaces in registry with said cap member apertures.

6. An electricity conductor unit of the class described, comprising the combination with a three sided substantially hollow cap member having paired apertures for the passage of blades of an electrical attachment plug in a wall thereof, and a base member for cooperation with said cap member to form a closure therefor, said cap member and said base member each having angular grooves arranged in opposition; of electricity conductors disposed within said body and removably confined therein between such cap and base member grooves, and electric contact means secured to said electricity conductors and arranged in registry with said cap member apertures, said electric contact means having spaced legs to provide an aperture through which a blade of an attachment plug may pass when making contact with said contact means.

7. Electricity contact means comprising substantially cylindrical collars arranged in spaced, axial alignment and adapted to receive and engage an electricity conductor extending therethrough, and a body portion connected to said collars by legs defining, with said conductor, an opening to permit the passage of a blade of an electric attachment plug therethrough.

8. Electricity contact means comprising substantially cylindrical collars arranged in spaced, axial alignment and adapted to receive and engage an electricity conductor extending therethrough, and a body portion connected to said collars by legs defining, with said conductor, an opening to permit the passage of a blade of an electric attachment plug therethrough, a blade-contacting surface being disposed in registry with said opening.

9. Electricity contact means comprising a leg member for connection with an electricity conductor, and a body portion attached to said leg and providing a contact surface, said body portion being spaced from the said electricity conductor in offset relationship to said leg, whereby said body portion, said leg, and said conductor define an opening of sufficient size to permit the passage of a blade of an electric attachment plug therethrough.

10. A housing for mounting and securing a plurality of rigid circular electricity conductors in mutually insulated, uniformly spaced relationship, said housing being adjustable to the diameter of such conductors while maintaining the uniformity of spacing thereof, said housing comprising the combination with a three-sided substantially hollow cap member of electrical insulation material having transverse walls disposed therein, said transverse walls having a plurality of substantially V-shaped conductor-receiving grooves, the apex of the corresponding groove in each of said transverse walls being in mutually longitudinal alignment, said grooves having uniformly sloping sides; smooth side walls of said cap member extending from said transverse walls toward the open side of said cap; a base member of electrical insulation material adapted to operate as a closure for said cap, said base member having longitudinally extending substantially V-shaped grooves arranged in opposition to the grooves in said cap member, said grooves having uniformly sloping walls converging toward the apex which is in a common vertical plane with apices of the grooves in the cap member; said base member having smooth vertical side walls for slidable engagement with the side walls of said cap member and being of less height than that portion of said cap-member side walls which extends beneath the transverse walls thereof, whereby the base member may be brought closer to or moved away from the transverse walls of the cap member, while maintaining contact with the side walls thereof; and means for securing the cap and base members.

11. An electricity conductor unit comprising a substantially hollow body, a pair of apertures in a wall of said body being spaced in accordance with the spacing of a standard two blade attachment plug and affording access of the blades thereof into the interior of the body, a trio of electricity conductors removably disposed within said hollow in mutually insulated spaced relationship, said plug-blade openings straddling the central of said three conductors and being equidistant between the said central conductor and the respective outer conductors; and contact means secured to a selected two of said electricity conductors and offset to bring contacting surfaces in registry with the said plug-blade receiving apertures.

JOSEPH F. O'BRIEN.